(12) United States Patent
Cooprider et al.

(10) Patent No.: US 12,330,558 B2
(45) Date of Patent: Jun. 17, 2025

(54) TRAILER CLEARANCE MONITORING SYSTEM FOR COMMERCIAL VEHICLES

(71) Applicant: Stoneridge, Inc., Novi, MI (US)

(72) Inventors: Troy Otis Cooprider, White Lake, MI (US); John Kirwan, Troy, MI (US); Banuprakash Murthy, Novi, MI (US)

(73) Assignee: STONERIDGE, INC., Novi, MI (US)

( * ) Notice: Subject to any disclaimer, the term of this patent is extended or adjusted under 35 U.S.C. 154(b) by 0 days.

(21) Appl. No.: 18/377,496

(22) Filed: Oct. 6, 2023

(65) Prior Publication Data

US 2024/0116441 A1 Apr. 11, 2024

Related U.S. Application Data

(60) Provisional application No. 63/413,709, filed on Oct. 6, 2022.

(51) Int. Cl.
*B60R 1/00* (2022.01)
*B60R 1/24* (2022.01)

(52) U.S. Cl.
CPC ............... *B60R 1/002* (2013.01); *B60R 1/24* (2022.01); *B60R 2300/8086* (2013.01)

(58) Field of Classification Search
CPC .. B60R 1/00; B60R 1/002; B60R 1/008; B60R 1/24; B60R 2300/8086; B60R 2300/8093; G06V 20/56; G06V 20/58; G06V 20/588; G06V 20/62; G06V 20/63; B60W 2050/143; B60W 2050/146; B60W 30/0956; B60W 30/09; B60W 50/14; G06T 2207/30248; G06T 2207/30252; G06T 2207/30261; G06T 2207/30264; G06T 2207/30268; B60Q 9/008; G08G 1/165
USPC ........................................................ 348/148
See application file for complete search history.

(56) References Cited

U.S. PATENT DOCUMENTS

| | | | |
|---|---|---|---|
| 10,229,596 B1* | 3/2019 | Weinberg | G06V 20/58 |
| 11,220,269 B2* | 1/2022 | Xu | B60W 40/076 |
| 11,373,415 B2* | 6/2022 | Rider | B60W 30/09 |
| 11,645,779 B1* | 5/2023 | Pertsel | G06N 3/045 |
| | | | 382/104 |
| 2010/0225738 A1* | 9/2010 | Webster | B60R 11/04 |
| | | | 348/36 |
| 2020/0156630 A1* | 5/2020 | Schmidt | B60W 30/0956 |

\* cited by examiner

*Primary Examiner* — Nathnael Aynalem
(74) *Attorney, Agent, or Firm* — Carlson, Gaskey & Olds, P.C.

(57) ABSTRACT

A camera monitor system for a vehicle includes at least one forward facing camera that has a field of view that at least partially encompasses a route of forward travel of the vehicle. A camera monitor system (CMS) is configured to receive a video feed from the at least one forward facing camera. The CMS includes a processor and a memory, the memory stores instructions for causing the processor to identify a clearance object in the video feed, for causing the processor to determine a clearance height of the clearance object from the video feed, and compare the clearance height of the clearance object to a height of a trailer, and initiate a response in response to the clearance height of the object being less than or equal to the clearance height of the trailer.

14 Claims, 6 Drawing Sheets

TRAILER CLEARANCE MONITORING SYSTEM FOR COMMERCIAL VEHICLES

CROSS-REFERENCE TO RELATED APPLICATION

This application claims priority to U.S. Provisional Application No. 63/413,709 filed Oct. 6, 2022.

TECHNICAL FIELD

This disclosure relates to commercial vehicle camera monitor system, and particularly to monitor a trailer clearance using a forward facing camera.

BACKGROUND

Camera monitor systems (CMS) utilize one or more cameras to provide an enhanced field of view to a vehicle operator. In one example, mirror replacement systems, and camera systems for supplementing mirror views, are utilized in commercial vehicles to enhance the ability of a vehicle operator to see a surrounding environment. In some examples, the camera monitor systems cover a larger field of view than conventional mirror based systems, or include views that are not fully obtainable via a conventional mirror based system.

In some examples, the images from the camera monitor system can be provided to other systems and/or the camera monitor system can provide supplementary analysis on the images and resultant outputs can be utilized to assist in vehicle operations and controls.

SUMMARY

In one exemplary embodiment, a camera monitor system for a vehicle includes at least one forward facing camera that has a field of view that at least partially encompasses a route of forward travel of the vehicle. A camera monitor system (CMS) is configured to receive a video feed from the at least one forward facing camera. The CMS includes a processor and a memory, the memory stores instructions for causing the processor to identify a clearance object in the video feed, for causing the processor to determine a clearance height of the clearance object from the video feed, and compare the clearance height of the clearance object to a height of a trailer, and initiate a response in response to the clearance height of the object being less than or equal to the clearance height of the trailer.

In a further embodiment of any of the above, the response includes activation of a warning system.

In a further embodiment of any of the above, the response includes rerouting a guidance system of the vehicle.

In a further embodiment of any of the above, determining the clearance height of the clearance object includes at least determining a pixel length from an edge of the clearance object to a road surface and converting the pixel length to a real world distance.

In a further embodiment of any of the above, determining the clearance height of the clearance object includes at least identifying a visual clearance indicator within the video feed using image analysis, and interpreting the visual clearance indicator.

In a further embodiment of any of the above, determining the clearance height of the clearance object includes determining a first clearance height by identifying the visual clearance indicator within the video feed and interpreting the visual clearance indicator and identifying a second clearance height by determining a pixel length from an edge of the clearance object to a road surface and converting the pixel length to a real world distance, and selecting one of the first clearance height and the second clearance height as the clearance height.

In a further embodiment of any of the above, selecting the one of the first clearance height and the second clearance height consists of selecting the shortest of the first clearance height and the second clearance height.

In a further embodiment of any of the above, the memory further stores instructions for identifying a position of the clearance object in a positioning system, and determines a stored clearance height of an object at that positioning system in a database.

In a further embodiment of any of the above, the memory further stores instructions for updating the stored clearance height in the database with the determined clearance height of the objection.

In a further embodiment of any of the above, the camera monitor system includes a camera arm that has a rear facing camera with an image capture unit that is configured to provide a desired field of view of the vehicle. A display is configured to depict at least a portion of the field of view. The rear facing camera and the display are in communication with the CMS.

In a further embodiment of any of the above, the warning system includes providing an output to the display.

In a further embodiment of any of the above, the desired view corresponds to a legally prescribed view that provides at least one of Class II and Class IV views.

In another exemplary embodiment, a method of monitoring trailer clearance includes the steps of detecting a clearance object in an image that is captured by a forward facing camera, determining a clearance height of a the clearance object from the image, comparing the clearance height to a trailer height, and initiating a response to the clearance height being less than or equal to the trailer height.

In a further embodiment of any of the above, the clearance height determining step includes at least determining a pixel length from an edge of the clearance object to a road surface and converting the pixel length to a real world distance.

In a further embodiment of any of the above, the clearance height determining step includes at least identifying a visual clearance indicator within a video feed from the forward facing camera using image analysis, and interpreting the visual clearance indicator.

In a further embodiment of any of the above, the clearance height determining step includes determining a first clearance height by identifying the visual clearance indicator within the video feed and interpreting the visual clearance indicator and identifying a second clearance height by determining a pixel length from an edge of the clearance object to a road surface and converting the pixel length to a real world distance, and selecting one of the first clearance height and the second clearance height as the clearance height.

In a further embodiment of any of the above, selecting the one of the first clearance height and the second clearance height consists of selecting the shortest of the first clearance height and the second clearance height.

In a further embodiment of any of the above, the method includes a step of storing instructions for identifying a position of the clearance object in a positioning system, and determining a stored clearance height of an object at that positioning system in a database.

In a further embodiment of any of the above, the method includes a camera arm that has a rear facing camera with an image capture unit that is configured to provide a desired field of view of the vehicle. A display is configured to depict at least a portion of the field of view. The rear facing camera and the display are in communication with the CMS.

In a further embodiment of any of the above, the warning system includes providing an output to the display.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments unless such features are incompatible.

DETAILED DESCRIPTION

Figure 1A:
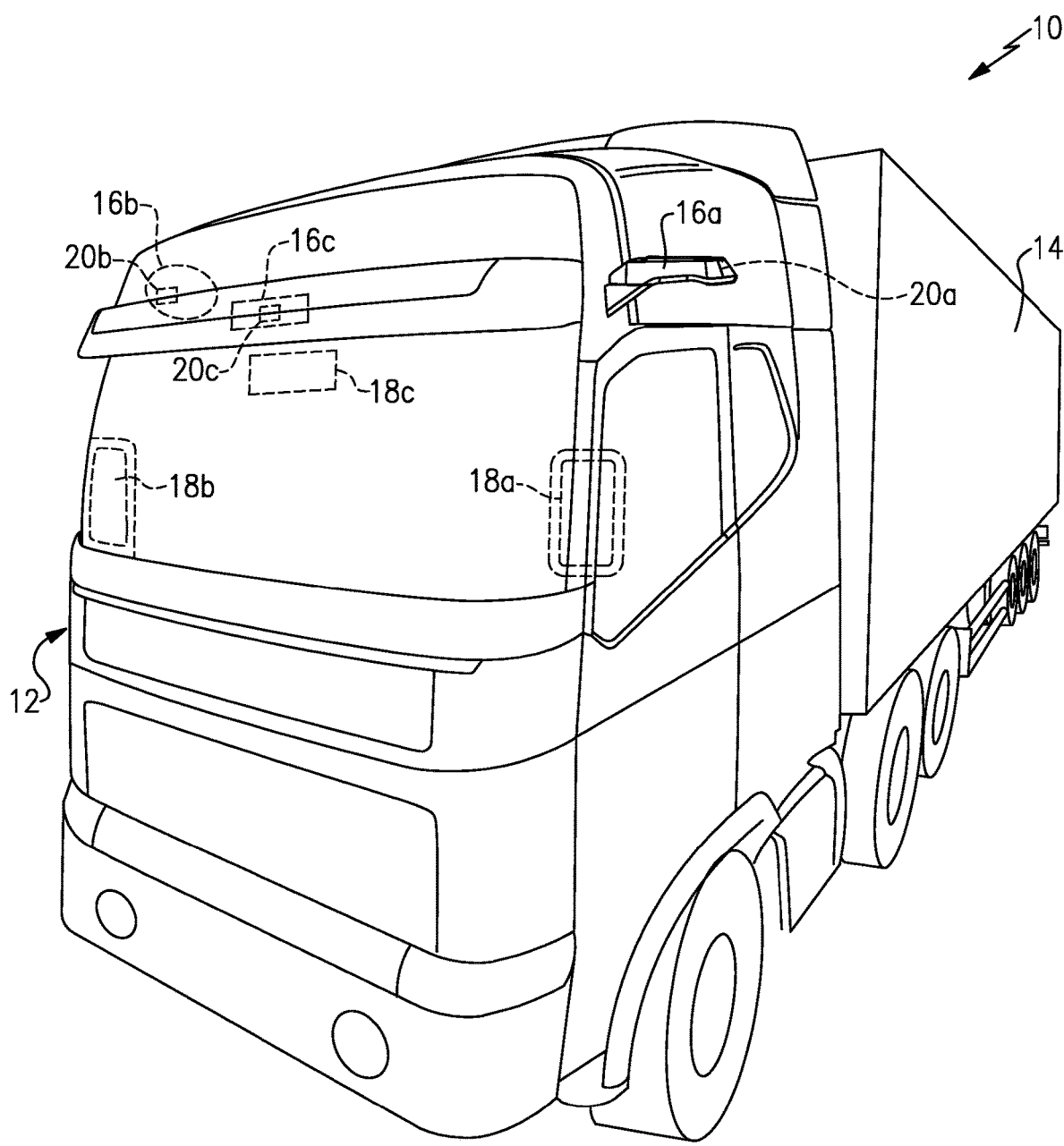
FIG. 1A is a schematic front view of a commercial truck with a camera monitor system (CMS) used to provide at least Class II and Class IV views.
Figure 1B:
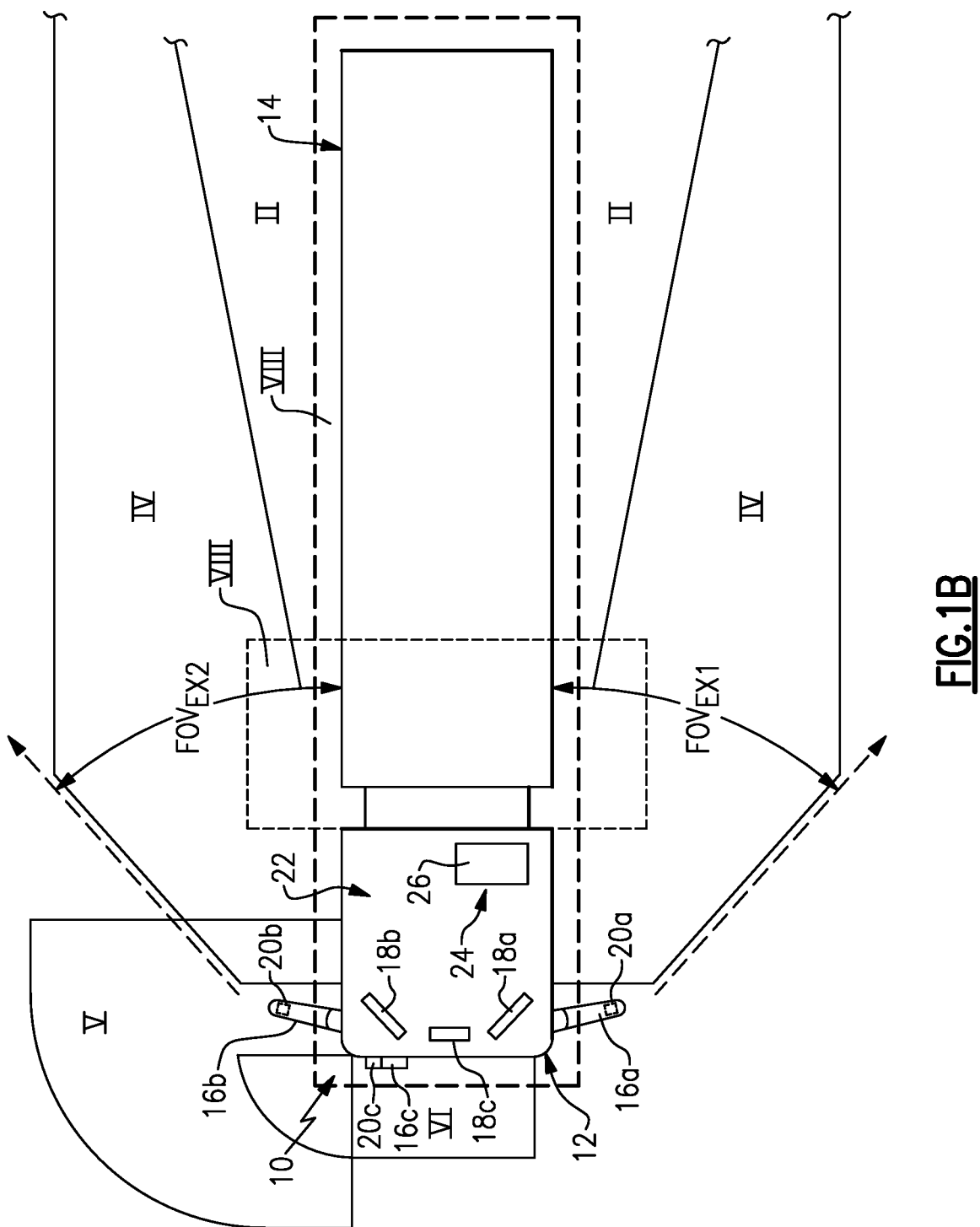
FIG. 1B is a schematic top elevational view of a commercial truck with a camera monitor system providing Class II, Class IV, Class V and Class VI views.
Figure 2:
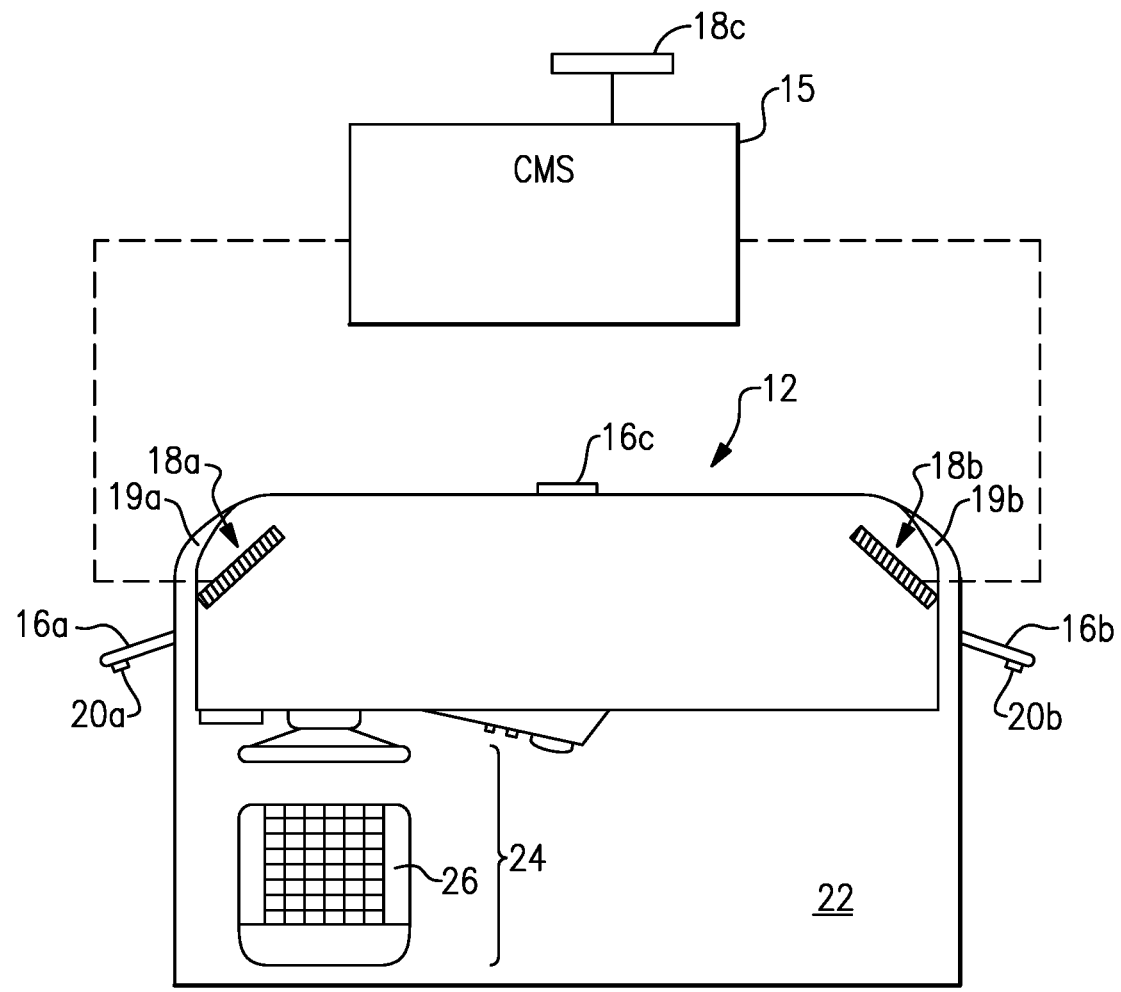
FIG. 2 is a schematic top perspective view of a vehicle cabin including displays and interior cameras.

A schematic view of a commercial vehicle 10 is illustrated in FIGS. 1A and 1B. FIG. 2 is a schematic top perspective view of the vehicle 10 cabin including displays and interior cameras. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Class II and Class IV views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and/or Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver. The displays 18a, 18b, 18c face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view.

In some examples, the controller 15 is in communication with a vehicle controller and/or connected to a vehicle data bus (e.g., a CAN bus). The communication allows the CMS controller 15 to receive and utilize sensor and operational information from the vehicle as well as other systems incorporated within the vehicle such as global positioning systems, geolocation systems, and other vehicle positioning systems.

With continued reference to FIGS. 1A-2, FIG. 3 illustrates a forward facing image 200 generated by a forward facing camera, such as camera 20c. In alternative examples, alternative forward facing cameras can be utilized within the system instead of or in addition to the camera 20c. Included within the forward facing image 200 is a clearance object (bridge 210). As used herein a clearance object is any obstruction that the vehicle passes under and which the vehicle must ensure adequate clearance exists to avoid a collision. A clearance height 214 is defined from the bottom edge 212 of the bridge 210 to the surface of the road 220. In some cases, such as the illustrated forward facing image 200, the bridge 210 can include a sign 216 with text 218 or symbols expressly identifying the clearance height 214 of the clearance object. Other clearance objects, such as trees and rock overhangs may have varying heights and no signs will be included.

In order for the vehicle to pass under the bridge 210, the tallest portion of the vehicle 10 should be shorter than the clearance height 214 of the bridge 210. In most cases, the tallest portion of the vehicle 10 will be the height of the trailer 14. In these cases, the vehicle 10 ensures that the trailer height is less than the clearance height 214 or the vehicle provides an alert to the operator that the vehicle is unable to proceed along the planned route.

Figure 3:
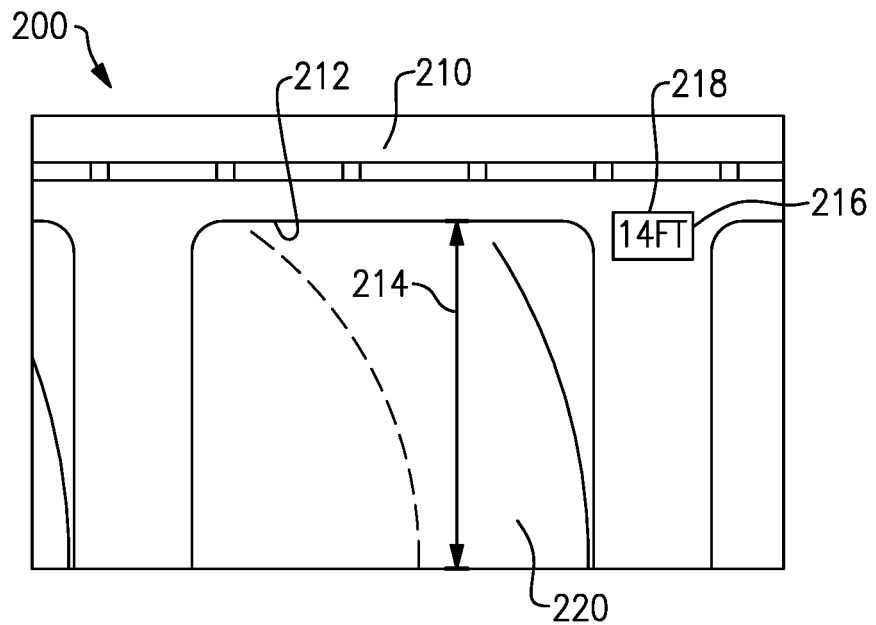
FIG. 3 illustrates an image or video frame generated by a forward facing camera and including a clearance object, such as a bridge.
Figure 4:
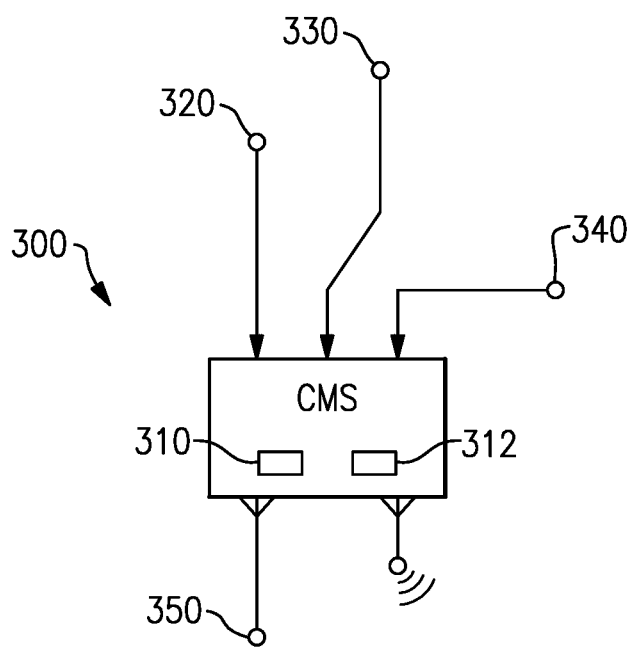
FIG. 4 schematically illustrates a camera monitor system.

With continued reference to FIG. 3, FIG. 4 schematically illustrates a camera monitor system (CMS) 300, such as the CMS 15, of FIGS. 1A, 1B and 2. Included within the exemplary CMS 300 are a processor 310 and a memory 312. The processor 310 and memory 312 are schematically illustrated as singular elements, however it is appreciated that each of the processor 310 and the memory 312 can alternatively be multiple interconnected processors and/or multiple interconnected memory systems. Further, inputs and outputs of the CMS 300 that are not impacted by and/or are not utilized within the process described herein are omitted for the sake of clarity and the CMS 300 is not limited to the illustrated inputs and outputs.

The CMS 300 receives one or more images from the forward facing camera(s) 16c via an input 320, and receives a geographic location of the vehicle 10 from a geolocation system via an input 330. In addition, the CMS 300 includes an input 340 connected to a vehicle data system (e.g., a CAN bus) for facilitating information exchange with additional systems and sensors on the vehicle. In some examples, the geographic location system can communicate through the CAN bus, allowing for the second input 330 to be omitted from the CMS 300.

Included within the memory 312 are instructions, in the form of a program, that enables the CMS 300 to analyze the received forward facing image 200 (or images) and determine that the vehicle is approaching a location or object where a clearance needs to be verified (referred to as a clearance object) and instructions, in the form of a program, that enables the CMS 300 to identify the clearance of the location being approached and compare the identified clearance to an identified trailer height of the vehicle. When the identified clearance requirement is less than the identified trailer height, a warning is output from the CMS 300, on an output line 350, to one or more displays within the view of the vehicle operator.

In some examples, the CMS 300 includes an additional wireless connection to one or more databases including maps or other information related to geographic positioning of clearance locations.

Figure 5:
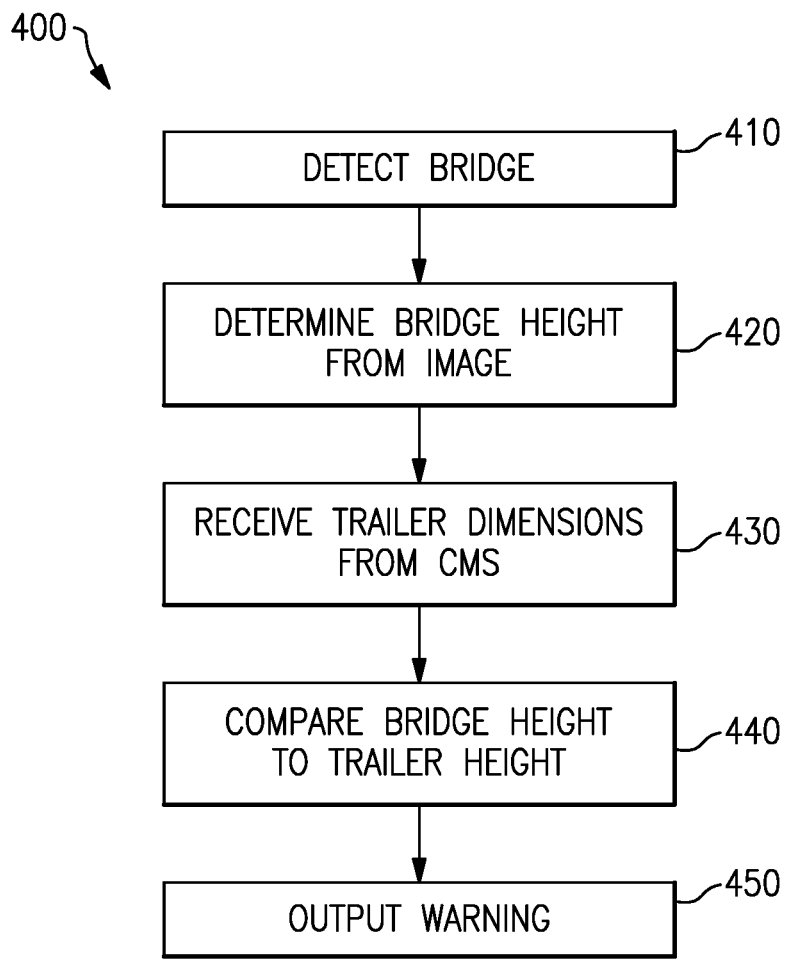
FIG. 5 illustrates a process for identifying and responding to approaching a clearance point.

With continued referenced to FIGS. 3 and 4, FIG. 5 schematically illustrates the process 400 operated by the CMS 300 to determine when a clearance warning should be provided to the vehicle operator. Initially, the CMS 300 uses object detection analysis on the received images 200 to detect the presence of a bridge 210, or other clearance object, within the forward facing image 200 in a "Detect Bridge" step 410. When a bridge is detected, the CMS 300 analyzes the features of the bridge object to determine the bridge height based on the image in a "Determine Bridge Height From Image" step 420. In one example, the bridge height is determined by first determining a pixel distance from the bottom edge of the bridge to a corresponding position on the road surface passing under the bridge. The CMS 300 then converts the pixel height to a real world distance using any known system.

In some examples the bridge, or other clearance object, includes a sign 216 having a text 218 or symbolic indication of the clearance height 214 of the object. When such a sign 216 is present, the CMS 300 can use object recognition to determine the clearance height 214 from the sign 216 without requiring the CMS 300 to determine the clearance height 214 by converting the pixel length to a real world measurement. In yet other examples, the CMS 300 can utilize both methods to determine an averaged, or weighted clearance height that represents both the image analysis based height and the height indicated on the sign 216.

After determining the clearance height 214, the CMS 300 identifies the trailer height in a "Receive Trailer Height from CMS" step 430. The trailer height can be identified using image analysis of one or more rear facing cameras, can be entered manually by a vehicle operator when the trailer is hitched to the vehicle, identified by a data connection between the CMS 300 and a controller within the trailer, or any similar way of identifying the trailer dimensions. In some examples, additional trailer dimensions beyond the height can be identified in the same step.

Once the trailer height has been identified, the CMS 300 compares the identified trailer height to the identified clearance height 214 of the bridge 210 in a "Compare Bridge Height to Trailer Height" step 440. When the clearance height 214 is equal to or less than the trailer height, the CMS 300 determines that the vehicle cannot pass under the bridge 210, and a warning is output to the one or more displays in an "Output Warning" step 450.

In some examples, in addition to the warning, the CMS can cause a navigation system to re-route the vehicle around the clearance object in response to identifying that the bridge, or other clearance object, has a clearance height 214 that is too short to pass under.

In yet other examples, the navigation system can include a map with information related to the height of known clearance objects (e.g., bridges and tunnels), and the initial route can be planned around the clearance objects. In such an example, the process 400 of FIG. 5 is used to verify that the vehicle is able to pass through clearance objects that are approached, and can be used in a secondary fashion to verify the accuracy of a clearance object that is approached and can update the stored maps and/or databases with the clearance height identified by the CMS 300.

Figure 6:
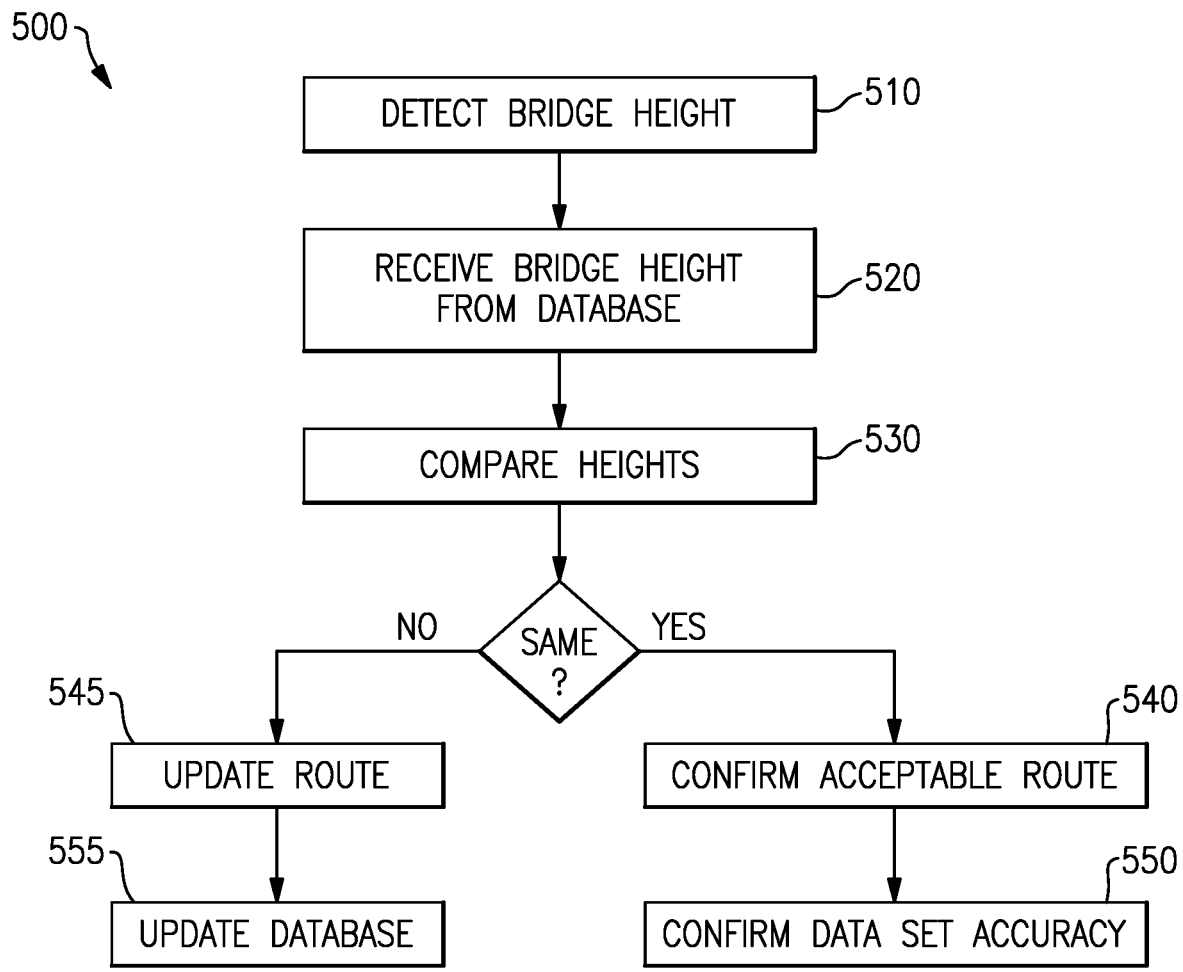
FIG. 6 illustrates a process for verifying acceptability of a planned route including clearance points.

FIG. 6 schematically illustrates an exemplary process 500 for using the detections described above to generate and/or update a set of map data with accurate and up to ate clearance height data. Initially, the process 500 detects a clearance height of a bridge or other clearance object in a "Detect Bridge height" step 510. Once determining the bridge height, the process 510 polls the map database for existing clearance heights stored in the databases and corresponding to the identified bridge or clearance object. When an existing entry is identified, the CMS 15 retrieves the existing height entry in a "Receive Bridge Height from Database" step 520.

The process then compares the entry with the detected height in a "Compare Heights" step 530, and the process 500 branches depending on whether the identified height and the entry match (yes) or don't match (no).

When the identified clearance height matches the entry, the planned route under the clearance object is confirmed in a "Confirm Acceptable Route" step 540 and the accuracy of the map data is confirmed in a "Confirm Data Set Accuracy" 550. The confirmation can update a listing in the data base with the most recent confirmation of the height, and/or increment an entry providing a weight to the accuracy of the entry.

When the identified clearance height does not match the entry, the route is updated to route the vehicle around the clearance object in an "Update Route" step 545. After updating the route, the CMS 300 sends instructions to the map database to update the clearance entry with the newly identified height in an "Update Database" step 555.

While described herein in specific regard to a bridge, it is appreciated that the process can be applied to any similar clearance objects such as bridges, low trees, overhangs, warehouse doors, and/or any object that the vehicle passes under either fully or partially.

While described above within the context of a specific mirror replacement system, it should be appreciated that the process can be applied to any camera monitor system including a camera capturing all or part of the trailer within its field of view. Although an example embodiment has been disclosed, a worker of ordinary skill in this art would recognize that certain modifications would come within the scope of the claims. For that reason, the following claims should be studied to determine their true scope and content.

What is claimed is:

1. A camera monitor system for a vehicle comprising:
at least one forward facing camera having a field of view at least partially encompassing a route of forward travel of the vehicle;
a camera monitor system (CMS) configured to receive a video feed from the at least one forward facing camera;
the CMS including a processor and a memory, the memory storing instructions for causing the processor to identify a clearance object in the video feed, for causing the processor to determine a clearance height of the clearance object from the video feed, and compare the clearance height of the clearance object to a height of a trailer, and initiate a response in response to the clearance height of the object being less than or equal to the clearance height of the trailer; and
wherein determining the clearance height of the clearance object comprises at least identifying a visual clearance indicator within the video feed using image analysis, and interpreting the visual clearance indicator, wherein determining the clearance height of the clearance object comprises determining a first clearance height by identifying the visual clearance indicator within the video feed and interpreting the visual clearance indicator and identifying a second clearance height by determining a pixel length from an edge of the clearance object to a road surface and converting the pixel length to a real world distance, and selecting one of the first clearance height and the second clearance height as the clearance height.

2. The camera monitor system of claim 1, wherein the response includes activation of a warning system.

3. The camera monitor system of claim 1, wherein the response includes rerouting a guidance system of the vehicle.

4. The camera monitor system of claim 1, wherein selecting the one of the first clearance height and the second clearance height consists of selecting the shortest of the first clearance height and the second clearance height.

5. The camera monitor system of claim 1, wherein the memory further stores instructions for identifying a position of the clearance object in a positioning system, and determining a stored clearance height of an object at that positioning system in a database.

6. The camera monitor system of claim 5, wherein the memory further stores instructions for updating the stored clearance height in the database with the determined clearance height of the objection.

7. The camera monitor system of claim 1, comprising:
a camera arm having a rear facing camera with an image capture unit configured to provide a desired field of view of the vehicle;
a display configured to depict at least a portion of the field of view; and
wherein the rear facing camera and the display are in communication with the CMS.

8. The camera monitor system of claim 7, wherein the warning system includes providing an output to the display.

9. The camera monitor system of claim 7, wherein the desired view corresponds to a legally prescribed view providing at least one of Class II and Class IV views.

10. A method of monitoring trailer clearance, comprising the steps of:
detecting a clearance object in an image captured by a forward facing camera;
determining a clearance height of a the clearance object from the image;
comparing the clearance height to a trailer height; and
initiating a response to the clearance height being less than or equal to the trailer height; and
wherein clearance height determining step comprises at least identifying a visual clearance indicator within a video feed from the forward facing camera using image analysis, and interpreting the visual clearance indicator, wherein the clearance height determining step comprises determining a first clearance height by identifying the visual clearance indicator within the video feed and interpreting the visual clearance indicator and identifying a second clearance height by determining a pixel length from an edge of the clearance object to a road surface and converting the pixel length to a real world distance, and selecting one of the first clearance height and the second clearance height as the clearance height.

11. The method of claim 10, wherein selecting the one of the first clearance height and the second clearance height consists of selecting the shortest of the first clearance height and the second clearance height.

12. The method of claim 10, comprising a step of storing instructions for identifying a position of the clearance object in a positioning system, and determining a stored clearance height of an object at that positioning system in a database.

13. The method of claim 10, comprising:
a camera arm having a rear facing camera with an image capture unit configured to provide a desired field of view of the vehicle;
a display configured to depict at least a portion of the field of view; and
wherein the rear facing camera and the display are in communication with the CMS.

14. The method of claim 13, wherein the warning system includes providing an output to the display.

* * * * *